United States Patent Office 3,538,141
Patented Nov. 3, 1970

3,538,141
DIMERIZATION OF ACRYLONITRILE
John Kollar, Bergen County, N.J., assignor to Halcon International, Inc., a corporation of Delaware
No Drawing. Filed Jan. 23, 1967, Ser. No. 610,827
Int. Cl. C07c 121/20
U.S. Cl. 260—465.8  4 Claims

ABSTRACT OF THE DISCLOSURE

The invention relates to the catalytic dimerization of acrylonitrile in liquid phase solution. Enhancement of the ratio of linear dimers to branched dimers is obtained by conducting the dimerization process in the presence of a catalytic amount of a tertiary phosphine wherein at least one of the monovalent substituents comprises a strong electron withdrawing group. Such improvement is also obtained by effecting dimerization in a relatively non-polar solvent wherein the weight ratio of solvent to acrylonitrile is at least about 1. Optimum improvement is obtained by utilizing a combination of the foregoing features in conducting the dimerization process.

---

This invention relates to dimerization of acrylonitrile. More particularly, the invention relates to an improved dimerization process for the production of linear dimers of acrylonitrile.

In general, dimerization may be regarded as the formation of the condensation product or polymer of two molecules, i.e., a dimer. It is known that acrylonitrile may undergo such reaction and the prior art is suggestive of various methods therefor. Illustrative thereof is the thermal dimerization process discussed in JACS, 71,324 (1949) which results essentially in the production of cyclic dimers of acrylonitrile. Another illustration is the catalytic dimerization process discussed in French Pat. No. 1,385,883, which provides generally for the obtention of a 1:2 ratio of linear to branched dimers of acrylonitrile by the use of a phosphine or phosphite catalyst and a proton donor such as water, acetic acid, ethanol and the like. More recently, a process for the production of a linear acrylonitrile dimer, specifically, 1,4-dicyano-1-butene, was disclosed in the U.S. Pat. 3,225,083, the data given therein revealing at best about a 2:3 ratio of linear to branched dimers. This patented process employs as catalysts certain tertiary aromatic phosphines, the only atoms contained therein other than phosphorus being C, H and O. The dimerization is effected in liquid phase solution, preferably in a tertiary hydroxylic solvent. It is indicated that the latter is believed to serve as a source of hydrogen ions which effectively inhibits formation and propagation of polymer chains normally associated with reactions of readily polymerizable materials at elevated temperatures. It is further indicated that while the solvent serving as the source of hydrogen ions may be employed as a mixture with inert diluents, no substantial advantage is seen therein, and the process is preferably conducted in the absence thereof.

It is evident from a consideration of the prior art processes relating to dimerization of acrylonitrile that heretofore the cyclic compounds and branched dimers have constituted the major products of reaction. When it is considered that the linear dimers of acrylonitrile usually have greater commercial value than their branched counterparts particularly for their use as precursors for hexamethylene diamine which is used in the manufacture of Nylon 66, and chemical intermediates, it is apparent that a need exists for upgrading the ratio of linear dimers to branched dimers. Further as the cyclic compounds are not valued as greatly as the linear and branched dimers, it would appear that improved economy would be had by reduction in the selectivity of cyclic compounds.

Accordingly, it is a principal object of the present invention to provide an improved acrylonitrile dimerization process characterized by an enhanced ratio of linear dimers to branched dimers.

Another object of the invention is to provide an improved acrylonitrile dimerization process characterized by a ratio of linear to branched dimers which is not substantially less than 1.

Still another object of the invention is to provide an improved dimerization process for the production of linear dimers of acrylonitrile wherein the dimerization products are characterized by a ratio of linear to branched dimers which is substantially greater than 1.

Other objects and advantages of the invention will in part be obvious and in part be pointed out hereinafter in the following detailed description.

In accordance with a principal embodiment of the present invention the process of dimerizing acrylonitrile in liquid phase solution may be improved to effect an enhanced ratio of linear dimers to branched dimers by conducting such process in the presence of a catalytic amount of a tertiary phosphine wherein at least one of the monovalent substitutents comprises a strong electron withdrawing group. The latter group may be joined directly to the phosphorus atom and thus be adjacent thereto or may be joined to an intervening carbon atom, as in the case of a methylene group, which is joined to the phosphorus atom, and thus be one carbon atom removed from the phosphorus atom. Also, the strong electron withdrawing group may be conjugated to the phosphorus atom, as in the case of an aryl compound such at nitrobenzene where the phosphorus atom is connected to the ring or as in the case of an unsaturated alkyl compound such as vinyl cyanide where the phosphorus atom is connected to the vinylene radical, thus

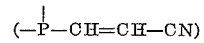

Illustrative strong electron withdrawing groups include nitro (—NO$_2$), cyano (—CN), thicyano (—SCN), formyl (—CHO), acyl (R.CO—), carboxy (—COOH), carbalkoxy (R.O.CO—) and carbamyl (H$_2$NCO—). The general class of the phosphine catalysts contemplated by the invention may be represented by the formula

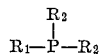

wherein R$_1$ consists of a strong electron withdrawing substituent and each R$_2$ is a member selected from the group consisting of alkyl, substituted alkyl, aryl, substituted aryl and strong electron withdrawing substituents. While $R_1$ and $R_2$ each may have up to 10 carbon atoms, it is preferred that alkyl chains be limited to 4 carbon atoms.

It has been found that the aforementioned tertiary phosphine catalysts wherein at least one of the monovalent substituents comprises a strong electron withdrawing group may be employed in a wide range of concentration. The maximum concentration is dictated essentially by economics, that is, the point at which the cost of additional catalyst outweighs the benefit of any increase in the ratio of linear dimers to branched dimers obtained thereby. The minimum concentration may be regarded as the smallest amount which is effective for the purpose of enhancing this ratio. Generally, the catalyst concentration may range broadly from an effective amount to about 15% by weight, desirably, from about ½ to about 12% by weight, and preferably, from about 3 to about 12% by weight, of the dimerization solution. It has been found that the novel use of the catalysts is attended by a significant increase in the ratio of linear dimers to branched dimers, a ratio of linear to branched dimers not substantially less than 1 being quite common. A judicious selection of reaction conditions coupled with the use of the catalysts permits the obtention of a ratio of linear to branched dimers which is substantially greater than 1. Substitution of a strong electron withdrawing group, such as cyano, for one of the monovalent substituents of triphenyl phosphine results in a ratio of linear dimer to branched dimer of the order of 9–20:1. Additional substitutions of strong electron withdrawing groups for the monovalent substituents of the phosphorus moiety results in an even greater ratio of linear to branched dimers. As the substituted strong electron withdrawing groups exert a diminishing influence on the catalyst activity, thus reducing the conversion of acrylonitrile, it is advantageous to limit the effect of the strong electron withdrawing group by substituting one or more alpha-substituted hydrocarbons of such group for the monovalent substituents of the phosphorus moiety rather than permitting such group to exert its full effect by direct or conjugated linkage. Added flexibility in balancing may be obtained by the substitution of two or more electron withdrawing groups of different electron withdrawing strengths. In such case the resultant ratio of linear to branched dimers and conversion of acrylonitrile would be attributable to the combined or net electron withdrawing strength of the several groups.

In another and significant embodiment of the invention, an upgraded ratio of linear to branched dimers is achieved by solvent dilution.

It is an essential feature of this latter embodiment that the dimerization of acrylonitrile be conducted in a relatively non-polar solvent wherein the weight ratio of solvent to acrylonitrile is at least about 1. For the purpose of the invention a relatively non-polar solvent may be regarded as a solvent having a dipole moment of less than about 2 Debye units, a Debye unit being equal to $10^{-18}$ electrostatic units. A dipole may be said to consist of two equal electrical charges, very close together and opposite in sign, the magnitude of which is measured by its moment, which is the product of either charge by the distance between the two charges. Preferred solvents for the practice of the invention have a dipole moment equal or substantially equal to zero Debye units and include benzene, cyclohexane, dioxane and toluene. However, other solvents having a dipole moment of less than about 2 Debye units may be employed in the inventive process with the accrual of substantial benefits and these include butylamine, diphenyl ether, methyl phenyl ether, phenylamine, ethylamine, phenyl acetate, methyl acetate and ethyl acetate. In the selection of a solvent it must be borne in mind, of course, that suitability is dependent on its liquidity at reaction temperature and pressure and its substantial inertness towards addition to or reaction with the unsaturated linkage of the acrylonitrile reactant or the dimer products. Contrary to many authorities, the necessity for dimerizing acrylonitrile in the presence of a proton donor, i.e., a substance yielding hydrogen ions, to improve the ratio of linear to branched dimers has found wanting. In fact, it has been found that the absence of a proton donor favors the ratio of linear to branched dimers. Accordingly, in a preferred embodiment of the invention, the selection of a suitable solvent is made with a view toward avoiding those solvents which yield hydrogen ions. Hence, in such embodiment hydroxylic solvents such as alcohols, silicols, acids and the like are intentionally avoided.

While the obtention of new results and advantages is dependent upon the faithful employment of the aforementioned concepts of the invention in the catalytic controlled liquid phase dimerization of acrylonitrile, such new results and advantages are no less dependent on reaction conditions and catalyst considerations.

It has been found that branched dimerization occurs at temeperatures as low 0° C.; linear dimerization occurs at as low as 70° C. and cyclic dimerization occurs at temperatures as low as 180°–190° C. In the practice of the inventive process, it is desired to employ a temperature in the range of 80° to 220° C., and preferably in the range of 130° to 190° C. The inventive dimerization process is also preferably conducted at ambient pressure, ranging from atmospheric to as high as 400 p.s.i.a. depending upon reaction temperature. However, dimerization under vacuum or at super-atmospheric pressure is contemplated, the essential criterion being the maintenance of a liquid phase during operation of the process.

The benefits to be derived from the practice of the invention relating to solvent dilution require the presence of a catalytic amount of a phosphorus-containing compound, such as triphenylphosphine. Exemplary phosphorus-containing compounds suitable as catalysts in the inventive process are many and varied and include such alkyl, aryl, and alkaryl phosphines and phosphites as are set forth in French Pat. No. 1,385,883 and U.S. Pat. No. 3,225,083, as well as the aforementioned tertiary phosphines wherein at least one of the monovalent substitutes comprises a strong electron withdrawing group. While the type of compounds suitable as catalysts in this embodiment of the invention are generally shown by the prior art, it has been found that the influence exerted by such catalysts varies with the quantity used. Accordingly, as discussed heretofore with regard to that concept of the invention which utilizes as a catalyst a tertiary phosphine wherein at least one of the monovalent substituents compromises a strong electron withdrawing group, it has been found advantageous to use broadly an effective amount to about 15% by weight, desirably from about ½ to about 12% by weight, and preferably from about 3 to about 12% by weight, of the dimerization solution.

Where a catalyst such as triphenylphosphine is employed, i.e., a catalyst having no strong electron withdrawing groups, it is advantageous to use broadly an effective amount to about 15% by weight, desirably from about 3 to about 12%, and preferably from about 6 to about 12% by weight of the dimerization solution.

In the most limited embodiment of the invention the dimerization of acrylonitrile is conducted in a catalytic, controlled liquid phase solution wherein a relatively non-polar solvent is employed, the weight ratio of solvent to acrylonitrile being at least about 1, and wherein the catalyst employed is a tertiary phosphine, at least one of the monovalent substituents comprising a strong electron withdrawing group as aforedescribed. In such instance an optimum ratio of linear to branched dimers is obtained.

In the course of the investigation leading to the present invention acrylonitrile was subjected to catalytic dimerization under various conditions. A number of runs were conducted to determine the effect of different compounds employed as catalyst and the results thereof are set forth in Table I.

TABLE 1 [1]

| Run | Acrylonitrile (gms.) | Solvent (gms.) | Catalyst (gms.) | Reaction time (hrs.) | Temp. (° C.) | Conversion to dimer (percent) | Dimer product (gms.) | | Weight ratio (linear/MGN) |
|---|---|---|---|---|---|---|---|---|---|
| | | | | | | | Linear | MGN [2] | |
| 1 | 400 | a 100 | c 10 | 24 | 160 | 0.33 | 1.25 | .05 | 25/1 |
| 2 | 400 | a 100 | d 5 | 12 | 140 | 0.83 | 3.19 | .14 | 22.6/1 |
| 3 | 400 | a 100 | e 5 | 24 | 140 | 1.95 | 7.46 | .34 | 21.9/1 |
| 4 | 400 | a 100 | f 10 | 12 | 140 | 2.18 | 8.29 | .41 | 20.2/1 |
| 5 | 100 | a 10 | g 1 | 6 | 160 | 4.7 | 4.46 | .24 | 18.6/1 |
| 6 | 100 | a 10 | h 1 | 3 | 150 | 6.4 | 6.07 | .33 | 18.3/1 |
| 7 | 50 | b 50 | h 1 | 3 | 150 | 2.8 | .96 | .44 | 2.2/1 |
| 8 | 50 | a 50 | h 1 | 3 | 150 | 3.2 | 1.54 | .06 | 27/1 |

[1] The dimer selectivity in all runs was between 94 and 96 percent by weight.
[2] Methylene glutaronitrile.
a p-Dioxane.
b Dimethylsulfoxide.
c Tricyanophosphine.
d Diphenylcyanophosphine.
e Diphenylthiocyanophosphine.
f Di-n-butylcyanophosphine.
g Diphenyl-p-cyanophenylphosphine.
h Diphenylcyanomethylenephosphine.

Inspection of Runs 1 through 4 reveals in all cases that an excellent ratio of linear to branched dimers is obtained when a tertiary phosphine catalyst is employed having at least 1 strong electron withdrawing group. However, as between Run 1, wherein the catalyst has 3 strong electron withdrawing groups and Runs 2 through 4, wherein the catalyst has only 1 strong electron withdrawing group, a significant distinction is noted. In Runs 2 through 4, the ratio of linear to branched dimers is less than in Run 1. However, this penalty is more than offset by the increased conversion (per pass) which exceeds the conversion in Run 1 by about 250 to about 660%.

Runs 5 and 6 indicate that an enhanced ratio of linear to branched dimers may be obtained notwithstanding the strong electron withdrawing group is not linked directly to the phosphorus atom. Even where the strong electron withdrawing group is conjugated (as in Run 5) or joined to a methylene group (as in Run 6) which is joined to the phosphorus atom, it will be noted that a high ratio of linear to branched dimers as well as a high conversion of acrylonitrile to dimers is obtained.

It would appear from a comparison of Runs 2 through 4, with Runs 5 and 6 that the higher ratios of linear to branched dimers may be attributed to the use of a tertiary phosphine catalyst wherein the strong electron withdrawing group is linked directly to the phosphorus atom. However, the linkages characterizing the catalysts employed in Runs 5 and 6 provide a significantly higher rate of conversion, more than 200%. Accordingly, it would appear that the linkages characterizing Runs 5 and 6 are preferred.

Runs 7 and 8 clearly depict the desirablity of utilizing a non-polar solvent in the practice of the invention. In Run 8, where a non-polar solvent, i.e., p-dioxane, was employed, there was a twelve-fold increase in the ratio of linear to branched dimers, as well as higher conversion, as compared with Run 7 which employed a high polar solvent, i.e., dimethylsulfoxide.

Runs 6 and 8 show the effect of the inventive solvent dilution feature quite clearly. With the exception that in Run 6 the dilution was 10% and in Run 8 the dilution was 50%, all other conditions were the same. The results of these runs clearly show that increased dilution enhances significantly the ratio of linear to branched dimers while at the same time reducing to some extent the conversion.

An additional number of runs were conducted to determine the effect of solvent dilution and solvent polarity. These results are shown in Table II.

TABLE II

| Run | Acrylonitrile (gms.) | Solvent (gms.) | Catalyst [1] (gms.) | Reaction time (hrs.) | Temp. (° C.) | Conversion to dimer percent | Reaction products (%) | | |
|---|---|---|---|---|---|---|---|---|---|
| | | | | | | | Linear | MGN [2] | DOCB [3] |
| 1 | 10 | a 30 | 4.8 | 1 | 200 | 5.4 | 61 | 36 | 4 |
| 2 | 10 | 30 | 2.4 | 2 | 200 | 4.4 | 61 | 36 | 3 |
| 3 | 20 | a 20 | 2.4 | 2 | 200 | 11.3 | 45 | 47 | 7.5 |
| 4 | 20 | a 20 | 1.2 | 1 | 200 | 3.4 | 52.5 | 30.8 | 16.7 |
| 5 | 40 | 0 | 1.2 | 1 | 220 | 6.2 | 21.6 | 47 | 31.5 |
| 6 | 40 | 0 | 1.2 | 2 | 200 | 7.8 | 26.2 | 59.7 | 14.5 |
| 7 | 20 | a 20 | 4.8 | 2 | 200 | 19.8 | 48 | 48 | 4 |
| 8 | 20 | b 20 | 4.8 | 2 | 200 | 5.2 | 53.7 | 46.3 | |
| 9 | 20 | c 20 | 4.8 | 2 | 200 | 3.2 | 25 | 62 | |
| 10 | 20 | d 20 | 4.8 | 2 | 200 | 9.3 | 20.6 | 78.5 | |
| 11 | 20 | e 20 | 4.8 | 2 | 200 | 15.9 | 6 | 94 | |

[1] Triphenylphosphine.
[2] Methylene glutaronitrile.
[3] Dicyanocyclobutane.
a p-Dioxane.
b Ether.
c Nitrobenzene.
d Acetonitrile.
e Dimethylsulfoxide.

Examination of Runs 1 through 6 of Table II clearly reveals that dilution of acrylonitrile favors the formation of the linear dimer from a 50% dilution on a weight basis results in about a 1:1 weight ratio of linear to branched dimers. A 75% dilution on a weight basis provides about a 2:1 weight ratio of linear to branched dimers.

It is observed in Table II that Runs 7 and 8 exhibit significantly superior ratios of linear to branched dimers as contrasted with Runs 9, 10 and 11. This new result and advantage may reasonably be attributed to the degree of polarity or dipole moment of the solvents employed. In Runs 7 and 8 it will be noted that relatively non-polar solvents were employed, that is, solvents having a dipole moment of less than 2 Debye units. It will be particularly noted that Run 7, wherein p-dioxane was used as a solvent, exhibited excellent conversion in conjunction with a high ratio of linear to branch dimers. This may be attributed to the fact that the dipole moment of p-dioxane is substantially zero Debye units. On the other hand, Runs 9, 10 and 11 utilizing highly polar solvents exhibited a relatively low ratio of linear to branched dimers.

While the invention has been described and disclosed in connection with various specific embodiments thereof, it is understood that no limitations or restrictions are intended thereby and that said embodiments are merely indicative of the best mode of practicing the invention, the embodiments thereof in which an exclusive property or privilege is claimed being defined as follows.

What is claimed is:

1. A process for the production of 1,4-dicyano-1-butene from acrylonitrile wherein the ratio of the 1,4-dicyano-1-butene to methylene glutaronitrile is greater than 1 which consists of reacting acrylonitrile in the liquid phase in the absence of a proton donor and in the presence of a catalytic amount of a phosphine catalyst having the formula:

$$R_1-P(R_2)-R_2$$

wherein $R_1$ is the cyano group and each $R_2$ is selected from the group consisting of alkyl and aryl groups having up to 10 carbon atoms and cyano groups.

2. The method of claim 1 wherein the said catalyst is diphenylcyanophosphine.

3. The method of claim 1 wherein the said catalyst is tricyanophosphine.

4. The method of claim 1 wherein the catalyst is di-n-butylcyanophosphine.

References Cited

UNITED STATES PATENTS

| 3,225,082 | 12/1965 | McClure | 260—465.8 |
| 3,225,083 | 12/1965 | McClure | 260—465.8 |

FOREIGN PATENTS

| 1,411,003 | 8/1965 | France. |
| 1,385,883 | 12/1964 | France. |
| 1,003,656 | 9/1965 | Great Britain. |

JOSEPH P. BRUST, Primary Examiner

U.S. Cl. X.R.

260—454, 465